US008618850B2

(12) United States Patent  (10) Patent No.: US 8,618,850 B2
Priego  (45) Date of Patent: Dec. 31, 2013

(54) DEVICE AND METHOD FOR GENERATING CLOCK SIGNALS FOR DC-DC CONVERTERS

(75) Inventor: Antonio Priego, Freising (DE)

(73) Assignee: Texas Instruments Deutschland GmbH, Freising (DE)

(*) Notice: Subject to any disclaimer, the term of this patent is extended or adjusted under 35 U.S.C. 154(b) by 672 days.

(21) Appl. No.: 12/645,715

(22) Filed: Dec. 23, 2009

(65) Prior Publication Data

US 2010/0164570 A1 Jul. 1, 2010

Related U.S. Application Data

(60) Provisional application No. 61/141,817, filed on Dec. 31, 2008.

(30) Foreign Application Priority Data

Oct. 29, 2008 (DE) .......... 10 2008 053 670

(51) Int. Cl.
*H03L 7/06* (2006.01)
*G05F 1/00* (2006.01)
*H02M 3/156* (2006.01)

(52) U.S. Cl.
USPC ............ 327/148; 327/147; 323/271; 323/351

(58) Field of Classification Search
USPC .......... 327/144, 145, 146, 147, 148; 323/282, 323/283, 284, 285, 286, 287, 288, 268, 271, 323/272, 351
See application file for complete search history.

(56) References Cited

U.S. PATENT DOCUMENTS 5,166,641 A * 11/1992 Davis et al. .................. 331/1 A
5,929,620 A * 7/1999 Dobkin et al. ................ 323/288
(Continued)

FOREIGN PATENT DOCUMENTS

DE 69817552 3/2004
EP 1592154 2/2005
WO WO2004062062 7/2004

OTHER PUBLICATIONS

"EMI Reduction in Switched Power Converters by Means of Spread Spectrum Modulation Techniques," Power Electronics Specialists Conference, 2004. PESC 04. 2004 IEEE 35th Annual, vol. 1, Jun. 20-25, 2004, pp. 292-296 (A. Santolaria, J. Balcells, D. Gonzalez, J. Gago and S.D. Gil).

(Continued)

*Primary Examiner* — Gary L Laxton
*Assistant Examiner* — Alex Torres-Rivera
(74) *Attorney, Agent, or Firm* — William B. Kempler; Wade J. Brady, III; Frederick J. Telecky, Jr.

(57) ABSTRACT

An electronic device includes a DC-DC converter for voltage conversion in a slave mode an in a master mode and including a phase locked loop. The phase locked loop comprises a controlled oscillator, a filter having an integration capacitor coupled to a control input of the controlled oscillator, a charge pump, and a phase frequency detector. In the slave mode, the controlled oscillator, the filter, the charge pump and the phase frequency detector are coupled to operate as the phase locked loop. There is a comparator coupled with an input to a control input of the controlled oscillator and with an output to the charge pump. In the master mode, the comparator is configured to control the charge pump in response to a control signal at the control input of the controlled oscillator when the phase frequency detector is switched off so as to perform a modulation of the control signal at the control input of the controlled oscillator by charging and discharging the integration capacitor.

4 Claims, 4 Drawing Sheets

(56) References Cited

U.S. PATENT DOCUMENTS

| | | | | |
|---|---|---|---|---|
| 6,040,742 | A | * | 3/2000 | Bailey et al. ............... 331/2 |
| 6,163,185 | A | * | 12/2000 | Deluigi et al. ............ 327/156 |
| 7,368,959 | B1 | * | 5/2008 | Xu et al. .................. 327/141 |
| 2010/0007389 | A1 | * | 1/2010 | Li et al. ................... 327/153 |

OTHER PUBLICATIONS

"Reduction of Power Supply EMI Emission by Switching Frequency Modulation," IEEE Transactions on Power Electronics, vol. 9, Issue 1, Jan. 1994, pp. 132-137 (Feng Lin and D. Y. Chen).

"Notes on SSC and Its Timing Impact," Intel, Rev. 10, Feb. 1998, pp. 1-9 (Michel T. Zhang).

* cited by examiner

DEVICE AND METHOD FOR GENERATING CLOCK SIGNALS FOR DC-DC CONVERTERS

CROSS-RELATED APPLICATIONS

This patent application claims priority from German Patent Application No. 10 2008 053 670.9, filed Oct. 29, 2008 and from U.S. Provisional Patent Application No. 61/141,817, filed Dec. 31, 2008, the entirety which are incorporated herein by reference.

FIELD OF THE INVENTION

The present invention generally relates to a device and method for generating clock signals for DC-DC converters.

BACKGROUND OF THE INVENTION

Switching frequency in power converters (for example DC-DC buck and boost converters) is limited mainly by the ability of power transistors to manage large power with short switching times. As new process generations improve the switching quality factor, higher switching frequencies in DC-DC converters can be achieved in order to reduce the size of the passive components and increase the power efficiency. A drawback of achieving higher switching frequencies is that, as the operating frequency is increased, the current and voltage presented in the system leads to greater levels of electromagnetic interference. Electromagnetic interference (EMI) is a problem in many electronic devices and there are very strict rules as to the standards devices must meet in terms of restricting EMI to a maximum level. There are two types of EMI; conducted EMI, which enters into the power supply network from the electronic device, and radiated EMI, which is radiated into the environment of the device.

General considerations of EMI reduction in power converters are presented by Santolaria et al., in EMI Reduction in Switched Power Converters by means of Spread Spectrum Modulation Techniques, 35th Annual IEEE Power Electronics Specialists Conference, pp. 292-296, Aachen, Germany and by Feng Lin and Dan Y. Chen in Reduction of Power Supply EMI Emission by Switching Frequency Modulation, IEEE Transaction on Power Electronics, vol. 9, no. I, January 1994.

Spread spectrum clock (SSC) techniques were originally developed to reduce electromagnetic interference (EMI) in communications and microprocessor systems working in the range of hundreds of MHz. In a DC-DC converter modulating the switching frequency using SSC techniques is becoming more and more popular with ever increasing switching frequencies. However, the use of SSC according to the prior art requires external components and/or additional silicon area.

SUMMARY OF THE INVENTION

It is an object of the invention to provide an electronic device and a method for DC-DC conversion having reduced EMI emission without a need of external components or much additional silicon area.

In an aspect of the invention, there is an electronic device, comprising a DC-DC converter for voltage conversion configured to be used in a slave mode and in a master mode. The electronic device (or the DC-DC converter) includes a phase locked loop. The phase locked loop comprises a controlled oscillator, a filter with an integration capacitor coupled to a control input of the controlled oscillator, a charge pump, and a phase frequency detector. The controlled oscillator (e.g. a voltage controlled oscillator), the filter, the charge pump and the phase frequency detector are configured to operate as the phase locked loop in the slave mode. In addition to the components of the phase locked loop, there is a comparator, which is coupled with an input to a control input of the controlled oscillator and with an output to the charge pump. In the master mode, the first comparator is configured to control the charge pump in response to a control signal at the control input of the controlled oscillator so as to perform a modulation of the control signal at the control input of the controlled oscillator by charging and discharging the integration capacitor. The phase frequency detector of the phase locked loop may then be switched off. The controlled oscillator may be an RC oscillator and comprise an oscillator capacitor and an oscillator resistor and a comparator configured to control charging and discharging of the capacitor in response to a controlled oscillator output signal, so as to give the output signal a saw tooth waveform. A controlled current source may be provided and configured to supply a current to the oscillation capacitor which is proportional to a level of the control signal.

An electronic device that is configured in accordance with advantageous aspects of the invention includes a DC-DC converter that is configured to be used in slave and master mode. The electronic device includes a phase locked loop (PLL). When the electronic device is configured in slave mode (first configuration), the PLL is enabled to synchronize the internal DC-DC converter clock to an external reference clock. When the electronic device is configured in master mode (second configuration), the phase locked loop can be disabled or can be adapted to generate a modulation signal for performing a spread spectrum modulation of the DC-DC converter internal clock. This internal clock, that is accessible at an output pin (often referred to as "switch pin") of the DC-DC converter (or electronic device), can be used as master clock (or reference clock) to synchronize additional switch converters present in the system and configured as slaves. The phase locked loop may include a controlled oscillator (e.g. a voltage controlled oscillator), a filter having an integration capacitor coupled to the control input of the controlled oscillator, a charge pump, and a phase frequency detector. The output of the controlled oscillator may be the internal clock of the DC-DC converter. The controlled oscillator, the filter, the charge pump and the phase frequency detector may be coupled in a first configuration in the slave mode to operate as a normal phase locked loop for synchronizing the internal DC-DC converter clock to an external reference clock (or master clock). Furthermore, there may be a comparator which monitors the control voltage of the oscillator when the electronic device is configured as master in the master mode of the electronic device. The phase frequency detector may then be configured to be switched off. Instead of the phase frequency detector, the comparator may then be used to control the charge pump to perform a modulation of the control signal of the controlled oscillator by charging and discharging an integration capacitor of the loop filter. In that way, the low frequency signal required for the modulation of the internal DC-DC clock is obtained. Accordingly, most of the components of the phase locked loop (charge pump, integration capacitor and voltage controlled oscillator) together with the comparator may be used in the master configuration (or second configuration) to modulate the internal clock of the DC-DC converter. This provides the advantage that only very few additional components, circuitry and modifications are required to change a conventional phase locked loop into a control loop which is capable of performing an SSC modulation of the DC-DC converter clock. This reduces the size of the required electronic circuit and thereby manufacturing costs of the electronic device. This kind of implementation of the SSC modulation is possible due to the relaxed jitter requirements in switch converter (DC-DC converters) applications with respect to the much higher jitter requirements of communications and microprocessor systems.

In a preferred embodiment, the control signal at the input of the controlled oscillator may have a triangular waveform. The amplitude and frequency of the triangular waveform defines the modulation parameters (modulation ratio, modulation frequency and modulation index). The triangular waveform may advantageously be obtained by integration of a charge pump current on the integration capacitor of the loop filter. A triangular waveform is advantageous, since it easy to achieve and gives a flat distribution of the harmonics resulting from the modulation.

Low modulation frequencies yield high attenuations. Advantageously, the modulation frequency of the switch converter must be above 20 kHz. In this way, the modulation frequency is above the sensitive audio frequency range. Most advantageously, the modulation frequency of the modulation signal can be about 30 kHz, in particular 33 kHz.

The modulation frequency may be a function of the dimensions of the charge pump and the capacitor. In this way, the modulation frequency can simply be tailored to requirements by fixing the relative dimensions of a few circuit components as desired. No further modification of the circuitry is required.

The controlled oscillator (or voltage controlled oscillator) may be a modified RC oscillator. It may comprise an oscillation capacitor Cosc, an oscillation resistor Rosc and a comparator. The capacitor Cosc is charged to a voltage VREFOSC at a rate defined by Rosc and Cosc (i.e. by the Rosc x Cosc time constant). The comparator monitors the capacitor voltage and discharges it when VREFOSC has been reached. This is an advantageous way to generate a clock (comparator output) and at the same time a ramp or sawtooth waveform (capacitor voltage) required for DC-DC converters using pulse width modulation. The optimum method of modulating the clock frequency in order to perform the spread spectrum clocking (SSC) is varying slightly the slope of the generated ramp. In order to vary the ramp slope, a controlled current source may be implemented in the electronic device and configured to supply a current to the oscillation capacitor which is proportional to the control signal.

The invention also provides a system including at least two electronic devices configured in accordance with aspects of the invention, i.e., for example a first DC-DC converter and a second DC-DC converter. One DC-DC converter may be configured to operate in master mode and one or more other DC-DC converters may be configured to operate in slave mode. The DC-DC converters running in slave mode may be synchronized to the master clock (modulated clock signal) from the DC-DC converter running in master mode. Using spread spectrum clocking and synchronization together prevents generation of intermodulation bands that can fall into audio frequencies and cause interference. As set out above, the modulation stage may be implemented by the first control loop. In other words, the first control loop in the master DC-DC converter performs the spread spectrum modulation of the frequency of the first clock signal and the slave devices synchronize to the first clock frequency. This means that only few additional components are required to implement the modulation stage in the master device, which simplifies production and reduces chip area. The bandwidth of the phase locked loops of the DC-DC converters used in slave mode should be wide enough in order to be able to track the spread spectrum clocking modulation from the master DC-DC converter. The PLL function of the master DC-DC converter can be disabled and most of the PLL blocks can be reused to perform an SSC modulation of the switching frequency. Then, the SSC function can be enabled only for the DC-DC converter which is the master device and the synchronization function can be enabled only for the DC-DC converter or DC-DC converters which are in slave mode. Therefore, no significant additional silicon area is required to obtain the spread spectrum clocking function.

The invention provides a method of DC-DC voltage conversion in a slave mode and in a master mode. In a slave mode, an output signal of a controlled oscillator of a phase locked loop is synchronized to an input signal. In a master mode, a charge pump of the phase locked loop is controlled in response to a control input of the controlled oscillator so as to charge and discharge an integration capacitor of a loop filter of the phase locked loop. As a result, the output signal of the controlled oscillator of the phase locked loop is modulated.

The invention also provides a method of synchronizing a first clock signal having a first clock frequency controlled by a first control loop and a second clock signal having a second clock frequency controlled by a second control loop. The first and second clock signals may be configured to be used for voltage conversion. Furthermore, a control signal is generated to perform a spread spectrum modulation of the first clock frequency, and the second clock signal is synchronized with the spread spectrum modulated first clock signal. Performing both a synchronization of the first clock signal and the second clock signal and a spread spectrum clocking of the first clock signal allows intermodulation products in sensitive frequency bands such as the audio band to be reduced, which would otherwise cause interference with required signals. Using just a part of the first phase locked loop, for example, and switching off the functionality of the phase frequency detector means that no extra circuitry is required in the DC-DC converter. Therefore, existing designs can be simply adapted to perform the method of the present invention without extra cost and without taking up additional space on the circuit.

BRIEF DESCRIPTION OF THE DRAWINGS

Further characteristics and advantages of the invention ensue from the description below of a preferred embodiment with reference to the accompanying drawings in which.

DETAILED DESCRIPTION OF EXAMPLE EMBODIMENTS

Figure 1:
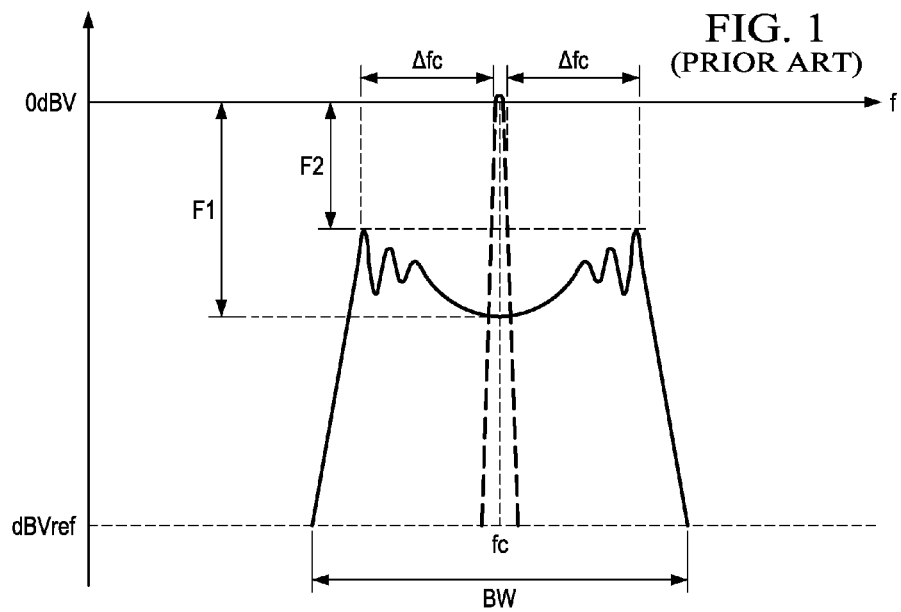
FIG. 1 is a representation of a modulation of a carrier signal.

FIG. 1 is a graphical representation based on a publication of Santolaria et al., EMI Reduction in Switched Power Converters by means of Spread Spectrum Modulation Techniques, 35th Annual IEEE Power Electronics Specialists Conference, pp. 292-296, Aachen, Germany. FIG. 1 shows the amplitude as a function of frequency of spread spectrum modulation of a signal having a carrier frequency $f_c$. A non-modulated harmonic of the carrier frequency, centered about the carrier frequency $f_c$, is shown as a dotted line, with a modulated signal, also centered about the carrier frequency $f_c$ and having side band harmonics, being shown as a solid line. The modulated signal has a bandwidth BW.

The modulation index mf is defined as $$m_f = \frac{\delta \cdot f_c}{f_m},$$

where $f_c$ is the carrier frequency, fm is the modulation frequency and $\delta$ is the modulation ratio. $\delta$ is defined as $$\delta = \frac{\Delta f_c}{f_c}.$$

$\Delta f_c$ is the peak deviation of the carrier frequency. The carrier frequency $f_c$ is modulated by the modulation frequency fm to produce a modulated signal having a bandwidth BW. After modulation, side band harmonics in the modulated signal are produced, so the total bandwidth BW of the modulation signal is $$BW = f_m(1+m_f) = 2 \cdot (\Delta f_c + f_m)$$

None of the harmonics should fall into sensitive frequency ranges such as the audio frequency range. Using a higher modulation index achieves a larger attenuation of noise in the modulated signal. This can be achieved by increasing the modulation ratio and/or decreasing the modulation frequency, however the modulation frequency should not be less than a lower frequency limit, which is at about 9 kHz according to existing rules and at about 20 kHz due to the audio range. F1 indicates the damping at the carrier frequency due to SSC modulation and F2 indicates the difference between the maximum sideband harmonics with SSC and the carrier without SSC.

Figure 2:
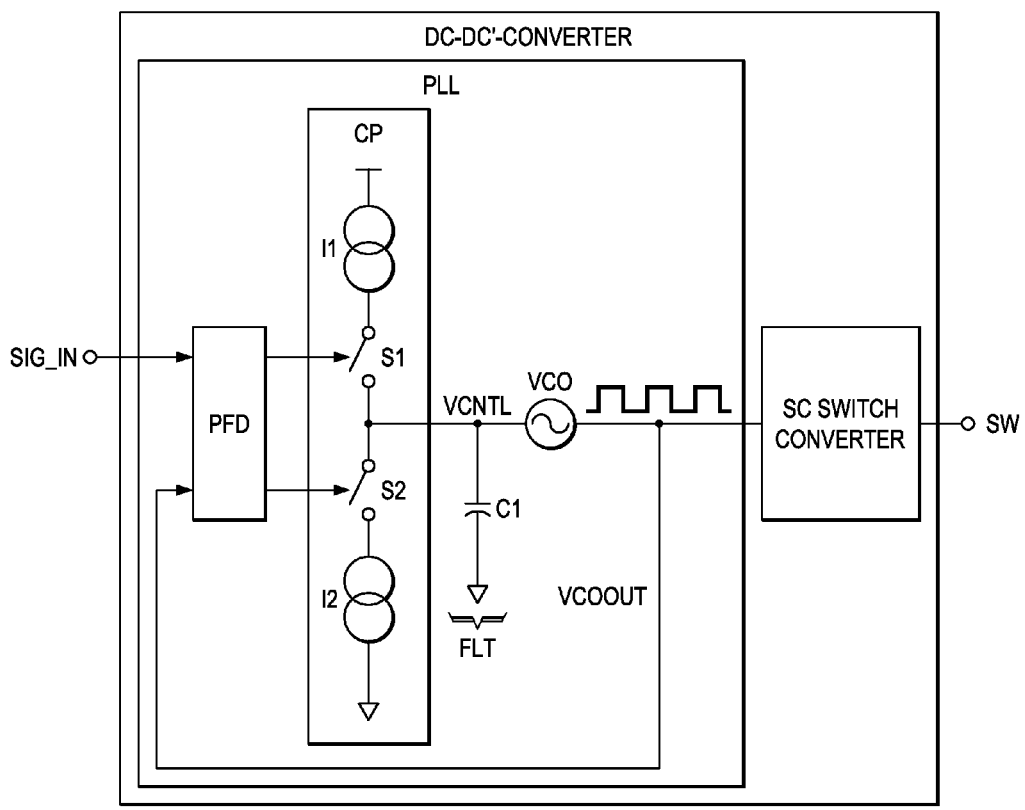
FIG. 2 is a simplified schematic of an electronic device according to the prior art.

FIG. 2 is a schematic block diagram of an electronic device according to the prior art. The electronic device maybe a DC-DC converter, either a buck, a boost or a buck/boost converter. The electronic device includes a phase locked loop PLL and several components for performing the voltage conversion. The components for performing the voltage conversion are not shown, but represented by the switch converter stage SC. The PLL includes a phase frequency detector PFD, a charge pump CP, a loop filter FLT, and a voltage controlled oscillator VCO. The output clock signal VCOOUT of the voltage controlled oscillator VCO is coupled in a feedback loop to an input of the phase frequency detector PFD. The phase frequency detector PFD compares the input signal SIG_IN with signal VCOOUT and controls the charge pump CP accordingly. The charge pump CP includes two current sources I1 and I2, which are alternately coupled to the loop filter FLT. The control voltage VCNTL at the integration capacitor C1 of the loop filter FLT is increased and decreased and adjusts the frequency of the voltage controlled oscillator VCO. The clock signal VCOOUT is also coupled to switch converter stage SC for driving the voltage conversion. The output signal SW of the DC-DC converter is derived from VCOOUT and has the same clock period as VCOOUT. In conventional DC-DC converter configurations, SW may be coupled to inductors, and buffer capacitors for providing a constant DC-DC converter output voltage. DC-DC converters, as the one shown in FIG. 2, may have many other input and output pins dedicated to other control and feedback purposes, which are not shown in FIG. 2.

Figure 3:
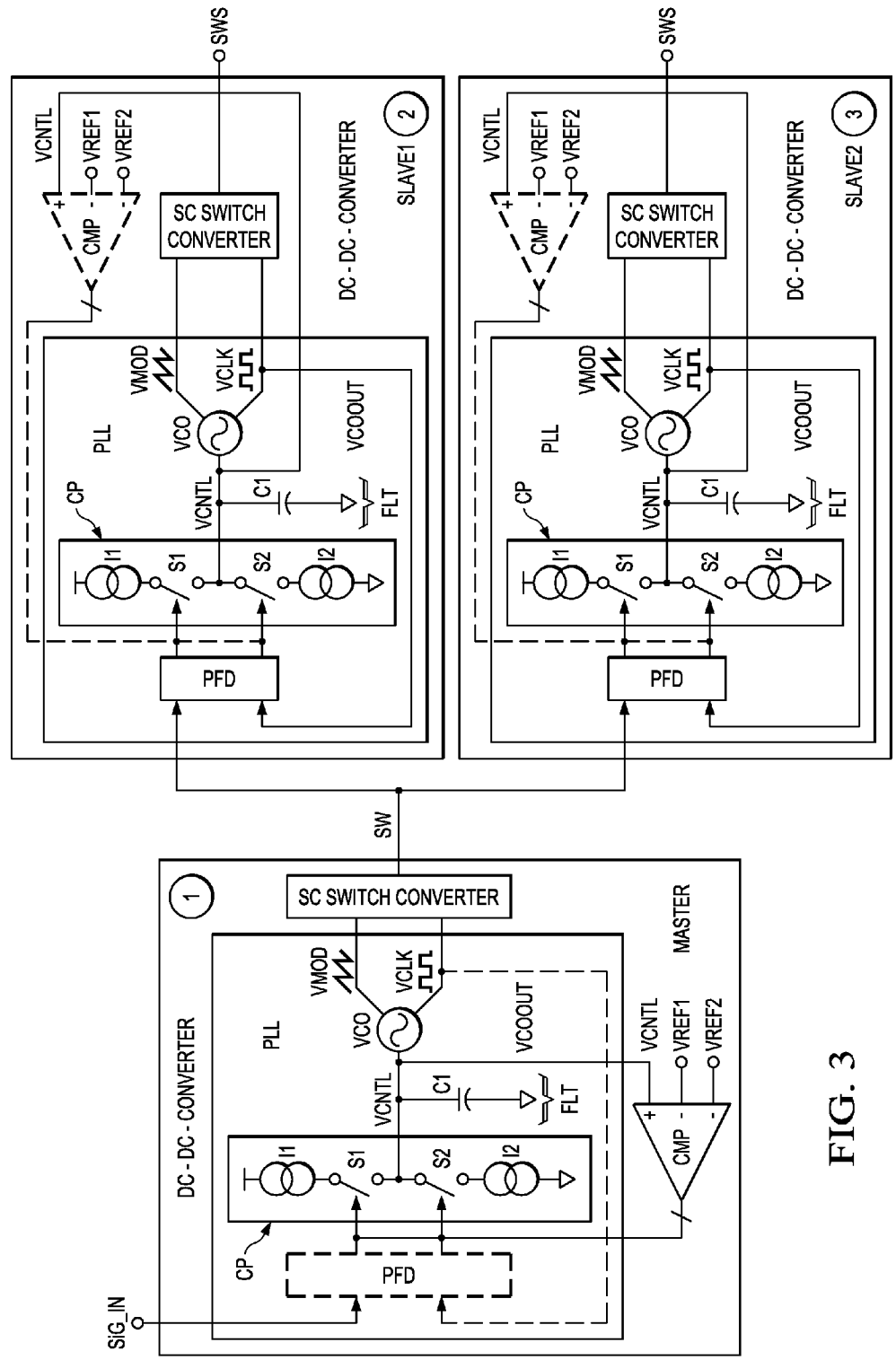
FIG. 3 is a simplified schematic of an electronic device according to an embodiment of the invention.

FIG. 3 is a schematic block diagram of an embodiment which is implemented according to aspects of the present invention. A master DC-DC converter 1 is coupled to two slave DC-DC converters 2 and 3. However, any number of slave DC-DC converters could be used and many aspects of the invention reside already in a single DC-DC converter (electronic device), be it configured as master or slave. Each of the DC-DC converters 1-3 includes a phase locked loop PLL and a switch converter stage SC as described with respect to FIG. 2. The PLL consists of a phase frequency detector PFD, a charge pump CP, a loop filter FLT and VCO. The phase frequency detector PFD is coupled to charge pump CP and controls switches S1 and S2 for switching current sources I1 and I2. The charge pump CP is coupled to a loop filter FLT, which is implemented by a capacitor C1. Furthermore, a voltage controlled oscillator VCO forms part of the PLL and has two outputs VMOD, VCLK connected to a switch converter stage SC, which represents all the remaining electronic components of a DC-DC converter.

Each of the DC-DC converters 1 to 3 is implemented according to aspects of the present invention. The conventional PLL of a DC-DC converter shown in FIG. 2 is modified. With respect to a conventional PLL, there is an additional comparator CMP, which is coupled with an input to the control node VCNTL of the voltage controlled oscillator VCO and arranged to provide a feedback signal to the inputs of the charge pump CP. Furthermore, the phase frequency detector PFD of each of the DC-DC converters 1-3 is adapted to be switched off while the charge pump CP is controlled by the comparator CMP. The electronic device has two configurations: a first configuration (master configuration), where the PFD is switched off or at least the functionality relating to the PLL of the PFD is switched off, and the comparator CMP controls the charge pump CP, and a second configuration (slave configuration), in which the PLL operates normally and synchronizes the VCO to the input signal SIG_IN.

The comparator CMP may be implemented as a window comparator having two inputs VREF1 and VREF2. The comparator CMP may then change its outputs (or control the charge pump to change from charging to discharging and vice versa) if the control voltage VCNTL reaches or exceeds the upper and lower voltage limits Vref1, Vref2. In the master DC-DC converter 1, the feedback line VCOOUT and the phase frequency detector PFD are represented by dashed lines. This means that the dashed feedback connection is switched off. In devices 2 and 3, which are in slave mode, the comparator CMP is switched off. The slave devices 2 and 3 are configured to synchronize their output signals SWS to modulated signal SW received from the master. The master DC-DC converter 1 provides the modulated output clock signal SW. Signal SW is modulated according to a spread spectrum clock modulation (SCC modulation). The comparator CMP provides that the integration capacitor C1 of loop filter FLT is charged through current source I1 and switch S1 during a first period, and it is discharged through switch S2 and current source I2 during a second period. As a result, the control voltage VCNTL increases and decreases linearly and periodically and assumes a triangular waveform around a basically constant average voltage level. Therefore, the voltage controlled oscillator VCO is controlled to modulate the oscillation frequency around centre frequency $f_c$ in accordance with the amplitude of the control voltage VCNTL at the input of the voltage controlled oscillator VCO. The VCO can be configured in order to provide a saw tooth output signal VMOD and a rectangular output signal VCLK received by the switch converter SC. In slave devices 2 and 3, the respective comparators CMP are switched off and the phase frequency detectors PFD are switched on. Therefore, the slave devices 2 and 3 synchronize their signals VMOD, VCLK and SWS to the clock signal SW received from the master device. As a result, all DC-DC converters 1 to 3 have internal clock signals, which are modulated according to a spread spectrum clocking scheme.

Figure 4:
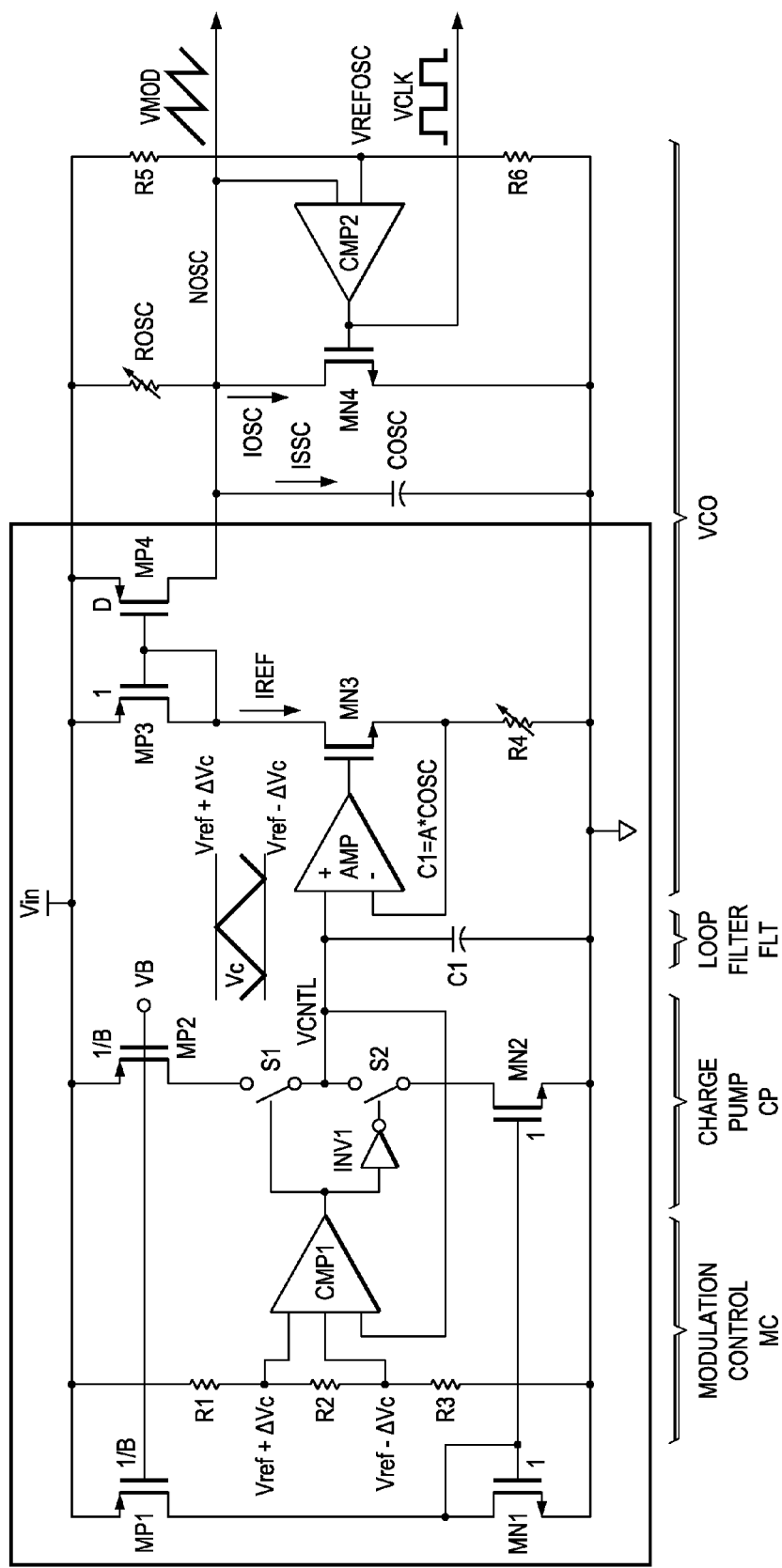
FIG. 4 is a simplified circuit diagram of a master DC-DC converter according to an embodiment of the invention.

The DC-DC converter 1 in master mode is shown in more detail in FIG. 4. Since the phase frequency detector PFD is switched off, it is not shown in FIG. 4. In master mode, the decisive components are the modulation control stage MC including comparator CM 1, the charge pump CP, the loop filter FLT with integration capacitor C1, and the voltage controlled oscillator VCO. The voltage controlled oscillator VCO is implemented as an RC oscillator having an oscillation resistor ROSC and an oscillation capacitor COSC. Comparator CMP1 monitors the control voltage VCNTL at the input of the voltage controlled oscillator VCO and controls the charge pump CP.

Comparator CMP1 may be a window comparator. In the present embodiment, the reference voltages Vref+ΔVc and Vref−ΔVc for the window comparator CMP1 are provided by a resistive divider including resistors R1, R2 and R3, which are coupled in series between supply voltage Vin and ground. The output of the comparator CMP1 is coupled to switches S1 and S2 of charge pump CP which includes transistors MN2 and MP2, which are configured to operate as current sources (I1, I2 of FIG. 3), switches S1 and S2 and an inverter INV1. MN2 is coupled in a current mirror configuration with MN1. The gates of transistors MP1 and MP2 are coupled together and receive a bias voltage VB. The loop filter FLT basically consists of an integration capacitor C1. In master mode, the comparator CMP1 controls switches S1 and S2 of charge pump CP, such that integration capacitor C1 is linearly charged and discharged. Therefore, the control voltage VCNTL on integration capacitor C1 ramps up and down in a triangular waveform. The amplifier AMP is coupled in a voltage follower configuration and receives the control voltage VCNTL. The output of amplifier AMP is coupled to transistor MN3 and resistor R4. This provides that the control voltage VCNTL is converted through amplifier AMP, MN3 and R4 into a reference current IREF. IREF is mirrored through transistors MP3 and MP4 so as to provide a variable part of the charging current ISSC for capacitor COSC. Capacitor COSC is part of the RC oscillator of the VCO. Capacitor COSC is charged by current ISSC. ISSC has a constant part, current IOSC, which is supplied through resistor ROSC and a variable part based on IREF and supplied through MP4. Comparator CMP2 monitors the voltage level of output voltage VMOD at node NOSC and compares it to a reference voltage VREFOSC (provided by resistive divider R5, R6). If VMOD exceeds VREFOSC, capacitor COSC is immediately discharged through MN4. Therefore, VMOD assumes a saw tooth waveform. VMOD ramps up with a slope which is defined by ISSC and adjusted through the variable current IREF derived from the control voltage VCNTL. Variable resistors R4 and ROSC can be used to adjust the center frequency $f_c$ of the VCO and the slope of the rising ramp of signal VMOD. At the output of comparator CMP2 a clock signal VCLK is provided that can be used as the rectangular pulse signal of the PLL, i.e. the PLL feedback signal.

The amplitude and frequency of the triangular waveform of the control voltage VCNTL defines the modulation parameters, for example the modulation ratio δ, the modulation frequency fm and the modulation index mf. The modulation parameters A, B and D shown in FIG. 4 are given by:

$$\delta \propto \frac{\Delta V_c}{Vref}$$

$$f_m \propto \frac{1}{A \cdot B \cdot D} \cdot \frac{f_c(0)}{\delta}$$

$$m_f = \frac{\delta \cdot f_c(0)}{f_m}$$

The modulation index mf has to be maximized in order to receive a higher attenuation. This can be achieved by increasing the modulation ratio δ or decreasing the modulating frequency fm always within the limitations considered in the description herein above relating to preservation of certain frequency bands. For a carrier frequency of, for example $f_c(0)=2.25$ MHz, a δ of 10%, a reference voltage VREFOSC=Vin/5, fm=33 KHz, and mf=7 parameters A, B and D may then be approximately as follows: A=3, B=10 and D=0.75.

Figure 5:
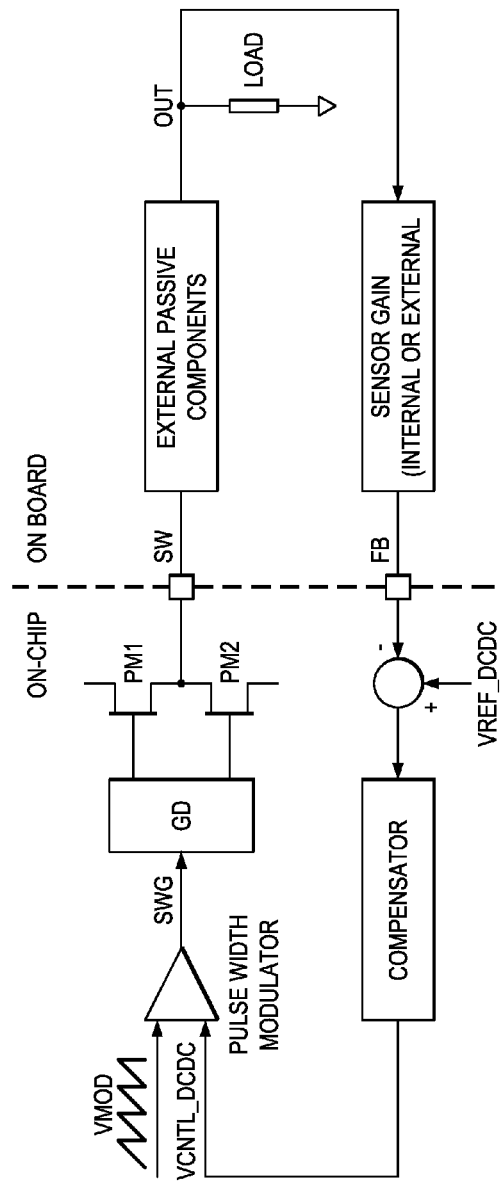
FIG. 5 is a simplified circuit diagram of a control loop for a DC-DC convert according to an embodiment of the invention.

FIG. 5 shows a simplified circuit diagram of a control loop for an electronic device, in particular a DC-DC converter, which is implemented in accordance with aspects of the invention, e.g. for a DC-DC converter as shown in FIG. 3 including the circuitry shown in FIG. 4. FIG. 5 shows how the saw tooth signal VMOD is used to generate the output signal SW in stage SC (Switch Converter shown in FIG. 3) and waveforms of signals VMOD, VCNTL_DCDC and SWG. VMOD (output signal in FIG. 4) may be applied to a comparator CMP, which compares VMOD with a feedback signal VCNTL_DCDC. The output signal of the comparator CMP is signal SWG, which is a pulse width modulated signal that can be used as input signal for gate driver stage GD producing the driver signals for power MOSFETS PM1 and PM2 of the electronic device, i.e. the DC-DC converter according to the embodiments of the invention. Power MOSFETs PM1 and PM2 are coupled at a node (pin SW) at which output signal (switch signal) SW is present. Through external passive components an output signal OUT is generated (DC-DC converter output signal) on a load LOAD. The output signal OUT (e.g. a voltage level) is sensed and fed back through a sensor gain stage SENSOR GAIN and feedback pin FB. The dashed line indicates a possible partitioning of ON-CHIP components and ON-BOARD, i.e. external components. Alternative implementations are possible. The feedback signal present at pin FB is combined with reference voltage VREF_DCDC (the sensed output voltage at pin FB is subtracted from VREF_DCDC) and passed through a compensator stage to become DC-DC control voltage VCNTL_DCDC. The level of VCNTL_DCDC determines the pulse width of pulse width modulated signal SWG and thereby the output voltage level at node OUT. For a SSC modulated signal VMOD the control mechanism shown in FIG. 5 may be applied having the advantage of a constant duty cycle as explained below with respect to FIG. 6.

Figure 6:
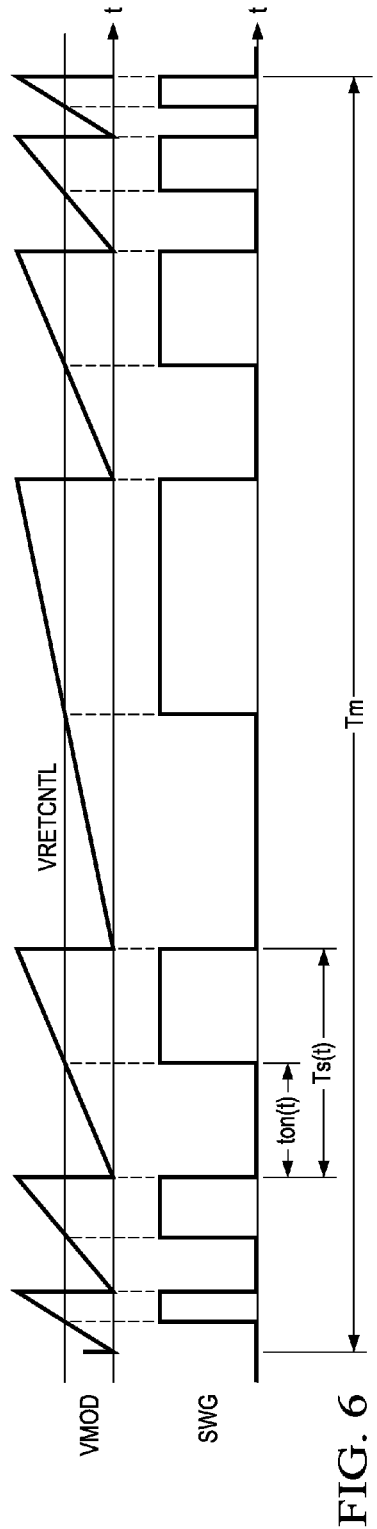
FIG. 6 is a representation of signals in an electronic device according to the embodiment of FIG. 5.

FIG. 6 shows waveforms of signals VMOD and VCNTL_DCDC of FIG. 5. The saw tooth signal VMOD and the rectangular pulse width modulated signal SWG used for driving a gate driver for power MOSFETs of the switch converter. Based on SWG, the switch converter output signal SW is generated (i.e. SW has the same duty cycle and period as SWG). The main advantage of using a saw tooth signal VMOD resides in the constant duty cycle of the pulse signal SWG, if the transients of the pulse signal SWG are determined by the control voltage level VCNTL_DCDC. The modulation time Tm represents one period of the triangular waveform of the pulse width modulated signal SWG. The duty cycle, which is the ratio between ton and Ts (both periods ton, Ts are functions of the time t) remains always constant over the whole modulation period Tm. Only the slope of the signal VMOD is varied.

An embodiment of the present invention has been explained above. The present invention, however, is not limited to said embodiment. Various kinds of modifications, substitutions and alterations can be made within the scope of the technical idea of the present invention as defined by the appended claims.

The invention claimed is:

1. An integrated circuit electronic device, comprising a control circuit for DC-DC converter for voltage conversion configured so that the same integrated circuit is usable in a slave mode and in a master mode and including a phase locked loop, the phase locked loop comprising:
   a controlled oscillator;
   a filter having an integration capacitor coupled to a control input of the controlled oscillator;
   a charge pump;
   a phase frequency detector;
   the controlled oscillator, the filter, the charge pump and the phase frequency detector being configured to operate in the slave mode as the phase locked loop wherein the phase locked loop synchronizes a clock in the slave DC-DC converter to a reference clock signal generated by an identical integrated circuit used in a master mode;
   a first comparator, which is coupled with an input to a control input of the controlled oscillator and with an output to the charge pump; and
   wherein, in the master mode, the first comparator is configured to control the charge pump in response to a control signal at the control input of the controlled oscillator so as to perform a modulation of the control signal at the control input of the controlled oscillator by charging and discharging the integration capacitor to generate the reference clock signal usable by an identical integrated circuit operating in a slave mode and wherein in master mode, the phase frequency detector is turned off and the reference clock generator is continuously varied in frequency.

2. The electronic device according to claim 1, wherein the controlled oscillator comprises an oscillator capacitor and an oscillator resistor and a second comparator configured to control charging and discharging of the oscillator capacitor in response to a controlled oscillator output signal, so as to give the output signal a saw tooth waveform.

3. The electronic device according to claim 2, comprising a controlled current source configured to supply a current to the oscillator capacitor which is proportional to a level of the control signal.

4. A system comprising at least two electronic devices according to claim 1, wherein a first one of the two electronic devices is configured as a master device and a second one of the electronic device is configured as a slave device and the second electronic device is coupled to receive a modulated output signal of the first electronic device as a reference input signal for the PLL.

* * * * *